United States Patent Office 3,257,447
Patented June 21, 1966

3,257,447
DERIVATIVES OF PROPIOLANILIDE
Lee A. Miller, Kirkwood, Mo., assignor to Monsanto
Company, a corporation of Delaware
No Drawing. Filed Dec. 18, 1961, Ser. No. 160,295
5 Claims. (Cl. 260—471)

This application is a continuation-in-part of my copending application Serial No. 77,485, filed December 22, 1960, now abandoned.

The present invention relates to nitrogeneous acetylenic compounds and more particularly provides a new and valuable class of propiolic acid derivatives and the method of preparing the same.

According to the invention, aromatic amides of propiolic acid are provided by the condensation of propiolyl chloride with a primary or secondary aromatic amine, substantially according to the scheme:

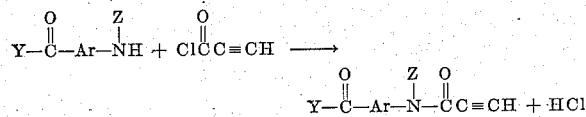

wherein Ar is selected from the class consisting of aromatic hydrocarbon radicals of from 6 to 12 carbon atoms, Y is selected from the class consisting of alkyl radicals of 1 to 8 carbon atoms and alkoxy radicals of 1 to 8 carbon atoms, and Z is selected from the class consisting of hydrogen and alkyl radicals of from 1 to 5 carbon atoms.

The aromatic primary or secondary amines suitable for the practice of this invention are characterized by the formula

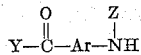

wherein Z is hydrogen for the primary amines, and an alkyl radical of 1 to 5 carbon atoms for the secondary amines. When Y in this formula is an alkyl radical of 1 to 8 carbon atoms, the amines are acyl aromatic amines, e.g., o-, m-, or p-acetylaniline, the isomeric N-methyl-acetylanilines, the isomeric propionylanilines, the isomeric N-ethyl-propionylanilines, the isomeric butyroylanilines, the isomeric N-isopropyl pentanoylanilines, the isomeric hexanoylanilines, the isomeric N-amyl octanoylanilines, etc. When Y is an alkoxy radical of 1 to 8 carbon atoms the reactants can be named as aminobenzoates, when the aromatic radical has 6 carbon atoms, and as amino-substituted esters of isomeric naphthoic acids, when the aromatic moiety has 10 carbon atoms, for example. The aromatic amines, according to the above general formula, react readily with propiolyl chloride, according to the invention, to give good yields of the aromatic propiolamides. Thus, p-acetylaniline (p-aminoacetophenone) and propiolyl chloride gives 4-acetyl-propiolanilide:

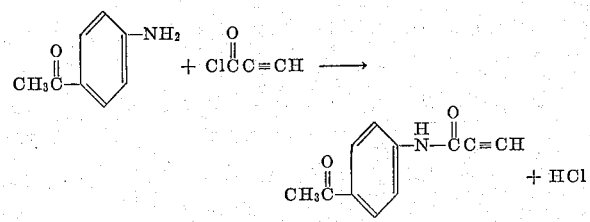

Similarly, ethyl p-aminobenzoate yields ethyl 4-propiolyl-aminobenzoate:

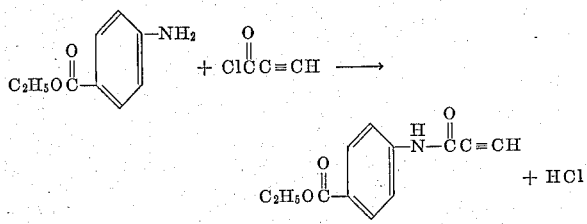

Examples of other aromatic propiolamides provided by the invention and the amines from which they are prepared by condensation with propiolyl chlorides are shown below:

Methyl, ethyl, propyl, isopropyl, butyl, tert-butyl or pentyl 2-, 3- or 4-propiolylaminobenzoate from methyl, ethyl, propyl, isopropyl, butyl, tert-butyl or pentyl 2-, 3- or 4-aminobenzoate.

2-, 3- or 4-acetyl-, 2-, 3-, or 4-propionyl-, or 2-, 3- or 4-valeroylpropiolanilide from 2-, 3- or 4-acetylaniline, 2-, 3- or 4-propionylaniline or 2-, 3- or 4-valeroylaniline.

Octyl 4-propiolylaminobenzoate from octyl 4-aminobenzoate.

N - (2-carboethoxy-4-biphenylyl)propiolamide from 2-carboethoxy-4-biphenylamine.

N-($\beta$-acetyl-$\alpha$-naphthyl)propiolamide from $\beta$-acetyl-$\alpha$-naphthylamine.

Ethyl ($\alpha$-propiolylamino) - $\beta$ - naphthalenecarboxylate from ethyl $\alpha$-amino-$\beta$-naphthalenecarboxylate.

2-butyrylpropiolanilide from 2-butyrylaniline.

N-($\beta$-butyryl-$\alpha$-naphthyl)propiolamide from $\beta$-butyryl-$\alpha$-naphthylamine.

The propiolyl chloride used in the present reaction is obtained by reacting propiolic acid with benzoyl chloride. The reaction between benzoyl chloride and propiolic acid is almost instantaneous at ambient temperature and being an equilibrium reaction it is desirable to remove one of the product materials during the course of the reaction in order to shift equilibrium in the desired direction. In this respect propiolyl chloride is relatively more volatile than other materials in the reaction mass and for that reason the temperature of reaction is controlled to cause vaporization of the propiolyl chloride during the course of the reaction. The preparation of propiolyl chloride according to this procedure forms the subject of the copending application of Lee A. Miller, Serial No. 6,344, filed February 3, 1960, now abandoned. The propiolyl chloride so formed may be led directly, without intermediate recovery, into a solution or suspension of the aromatic amine which is to be employed according to this invention.

Reaction of the aromatic amine with the propiolyl chloride takes place readily by simply contacting the chloride with the amine at ordinary or increased temperature and in the presence of an inert diluent or solvent. Optimum conditions include operation at temperatures which may be as low as, say, −10° C., i.e., extraneous heating is generally unnecessary; instead, because the reaction is usually exothermic, cooling may be employed. The ratio of acyl halide to the aromatic amine which is employed will, of course, depend upon the number of amino groups in the amine which it is desired to react, and it is advantageous to employ the reactants in such stoichiometric proportion. However, a slight excess of either the amine or the acyl halide may be used.

A preferred method of operation comprises a gradual addition of the propiolyl chloride into a solution of the aromatic amine in an inert solvent or diluent at a temperature which may be at or below room temperature. In initial runs it is recommended that addition of the halide be made into a cooled solution of the amine, and that the reaction mixture be allowed subsequently to attain room temperature gradually. In some instances it may be necessary to employ extraneous heat in order to complete the reaction.

Since the reaction is accompanied by the evolution of hydrogen chloride as by-product, it may be advantageous to provide for removal of the hydrogen chloride from the reaction zone. This can be done by dephlegmation and venting with rapid stirring, or by operating in the presence of a basic material as hydrogen halide scavenger, e.g., the alkali and alkali metal oxides or hydroxides, or basically reacting salts thereof such as sodium, potassium, lithium, rubidium, cesium, calcium, or magnesium hydroxide, carbonate or acetate. Conveniently, an excess of the amine component is employed for this purpose.

A solvent or diluent, though not necessary, is also recommended. This is because in the exothermic reactions it serves to dissipate heat of reaction and because, irrespective of the temperature conditions, use of the solvent or diluent minimizes a tendency of the hydrogen halide by-product to react with the triple bond of the initial propiolyl chloride and of the propiolamide product. In this connection, it is often advantageous to select the solvent or diluent on the basis of being less compatible with or having the poorest solvency for hydrogen chloride. Useful solvents for this purpose are generally the aromatic hydrocarbons or halohydrocarbons, e.g., benzene, xylene, chlorobenzene, etc. Also advantageously employed are the cycloalkanes, e.g., cyclohexane, cyclopentane or the alkyl-substituted cycloalkanes. Other presently-useful solvents include, e.g., hexane, acetone, ethyl ether, dioxane, etc.

The presently-provided aromatic propiolamides are stable, well-characterized compounds which are usually crystalline solids. They are advantageously employed for a variety of industrial and agricultural purposes, e.g., as hardening agents in synthetic rubber manufacturing processes; as hypnotics and soporifics in the pharmaceutical industry and as toxicant compositions effective in preventing or inhibiting the growth of fungi and bacteria.

The aromatic propiolamides of the invention are of great interest per se for the synthesis of an extensive number of organic compounds. The acetylenic bond in the propiolamide is very useful in syntheses not only owing to the reactivity which generally accompanies unsaturation but also owing to the activating effect of the amide radical on the acetylenic bond. Compounds containing reactive hydrogen thus add across the triple bond of the presently-provided propiolamides to give olefinic amides having a substituent at the terminal carbon atom. Thus, reaction of, say, 4-acetyl-propiolanilide with a hydroxy compound such as, say ethanol, gives 4-acetyl-(3-ethoxy-acryloyl)anilide. Acryloylanilides having various substituents at the 3-position of the acryloyl radical are thus obtained by employing, instead of ethanol, other compounds having a reactive hydrogen, e.g., phenol, thiophenol, aniline, butyric acid, thiolacetic acid, etc.

The acetylenic bond of the presently-provided propiolamides is readily halogenated or hydrogenated to give either the fully saturated or olefinically unsaturated amides, depending upon the reaction conditions. The olefinic amides thus obtained undergo vinyl-type polymerization to give homopolymers of high molecular weight and copolymerize with other unsaturated compounds. Accordingly, to one skilled in the art of organic synthesis, the presently-provided propiolamides are building materials of great potential.

The invention is further illustrated by, but not limited to, the following examples:

Example 1

A solution consisting of 8.8 g. (0.1 mol) of propiolyl chloride in 50 ml. of benzene was added during one minute to a rapidly stirred mixture consisting of 13.5 g. (0.1 mol.) of 4-acetylaniline(p-aminoacetophenone), 50 ml. of benzene, 200 ml. of water and 4.0 g. (0.1 mol.) of sodium hydroxide. During the addition the temperature of the reaction mixture rose from 5° C. to 16° C. The whole was then stirred at 5° C. for 10 minutes and subsequently allowed to warm to room temperature. A yellow solid formed. It was separated from the reaction mixture by filtration, and recrystallized 3 times from absolute ethanol to give the substantially pure 4-acetyl-propiolanilide, M.P. 145–6° C., analyzing 70.31% carbon and 5.2% hydrogen as against 70.58% and 4.85%, the calculated values.

Example 2

A solution consisting of 4.4 g. (0.05 mol.) of propiolyl chloride in 50 ml. of benzene was added over a 10 minute period to a stirred mixture consisting of 16.5 g. (0.1 mol.) of ethyl p-aminobenzoate and 250 ml. of benzene. During addition of the propiolyl chloride the temperature of the reaction mixture rose to peak of 38° C. After stirring the whole at room temperature for 4.5 hours, it was poured into 200 ml. of water. The resulting mixture was extracted with two 100 ml. portions of ether and the combined extracts and benzene layer were filtered to give a light yellow solid, M.P. 125–129° C. Repeated recrystallization from methanol gave the substantially pure ethyl 4-propiolylaminobenzoate, also properly named p-carboethoxy-N-propiolanilide, M.P. 143–4° C., analyzing 65.72% carbon and 5.40% hydrogen as against 66.35% and 5.10%, the calculated values.

Example 3

This example shows testing of the 4-acetyl-propiolanilide of Example 1, and the p-carboethoxy-N-propiolanilide of Example 2 against the bacteria *Staphylococcus aureus*. The following procedure was used.

A 1% acetone solution of the test compound was prepared and added to sterile, melted, nutrient agar to give a concentration of one part of the test compound per million parts of agar. The agar solution of the test compound was then poured into a Petri dish and allowed to harden. This plate, as well as duplicate controls (plates of sterile nutrient agar containing the same concentration of acetone but none of the test compound) were respectively inoculated with the *Staphylococcus aureus* and incubated for 2 days at 37° C. At the end of that time, inspection of the plates showed inhibited growth of the test bacteria on the plates which contained the one part per million concentration of the product of Example 1 or the product of Example 2, whereas profuse growth of the test organism was noted on the controls.

Example 4

This example shows testing of the product of Example 1 and the product of Example 2 against the fungus *Aspergillus niger*. The following procedure was used:

An inoculum preparation of *Aspergillus niger* SN–111 was prepared by adding 10 ml. of sterile distilled water to a 7-day old, Sabouraud's dextrose agar slant culture thereof and dislodging the spores into the water with a transfer needle.

Culture media was prepared by respectively adding 18 ml. of Sabouraud's dextrose agar to 18 x 150 mm. straight side test tubes, capping with metal culture tube caps, and sterilizing in an autoclave for fifteen minutes at 121° C.

A stock solution of the test compound was prepared by dissolving 100 mg. of the compound in 10 ml. of acetone; a 1% acetone solution of the compound was thus obtained.

Using a sterile 5 ml. pipette, 2 ml. of said 1% solution were respectively transferred to a tube of melted, sterile culture media prepared as described above. Dilutions of 1 part of test compound per 1,000 parts of agar resulted. Dilution was thus repeated until a concentration of one part of test compound per 100,000 parts of agar was obtained. The thus-diluted agar was then poured into a sterile Petri dish and allowed a harden. Two dishes of agar containing the same concentration of acetone but none of the test compound were also prepared and allowed to harden; these were to be used for "controls."

The plates of agar were then respectively inoculated with one drop of the above-described inoculum preparation. Examination of the plates after a five-day incubation period showed no growth of the *Aspergillus niger* in plates which contained the 1:100,000 concentration of the 4-acetyl-propiolanilide or the p-carboethoxy-N-propiolanilide, whereas profuse growth of the *Aspergillus niger* was noted in the "control" plates.

*Example 5*

The products of Example 1 and Example 2 were tested against the fungus *Alternaria solani* (the causal organism of tomato blight). The testing was conducted by spraying to run-off, four uniform Bonny Best tomato plants at the 4-5 leaf stage with an 0.03% aqueous emulsion of the respective products, allowing the sprayed plants to dry, subsequently inoculating the plants with said tomato fungus, maintaining the thus-sprayed and inoculated plants in a moisture chamber at 70° F. for 36 hours, and finally removing them to a greenhouse bench and periodically inspecting the plants for incidence of the disease during a five-day period. At the end of this time, the plants were observed to be flourishing and free of disease, whereas controls, i.e., plants which had not been sprayed but had been similarly inoculated and maintained, were disease-ridden.

*Example 6*

The 4-acetyl-propiolanilide of Example 1, and p-carboethoxy-N-propiolanilide of Example 2 were tested against the soil fungus *Rhyizoctonia solani*. Testing was conducted by adding to soil which had been uniformly infected with the fungus a quantity of the test material in a quantity equivalent to 0.01% the weight of the soil. The materials were mixed, and incubated at 25° C. for 24 hours. Pots of the incubated soil were sowed with cotton and cucumber seeds, and then maintained for 48 hours at 70° F. at a high relative humidity (96-98%). The pots were then transferred to the greenhouse, maintained there for two weeks, and inspected for the number of seedlings that emerged and the condition of their shoots and roots. A similar testing procedure was conducted with controls, i.e., similarly inoculated soil which had not been chemically treated. A very poor percent emergence and a stunted, diseased condition of those of the plants which emerged were noted in the controls, whereas excellent germination and plant growth were observed in the pots of inoculated soil which had been treated with the aforesaid product of Example 1 and product of Example 2.

The presently-provided propiolamides may be applied directly to the microorganism, e.g., bacteria or fungi to be combatted, e.g., by spraying, or they may be applied to plants or other locale, in a manner so as to function either as a preventive or therapeutic agent in advance of an anticipated infection. Dust, emulsion of solution formulations may be employed for such application; furthermore, adhesive and wetting agent additives may be employed in the compositions to assist in the distribution thereof on the surfaces to be protected from the pests. The concentrations of the presently-provided propiolamides which are employed in bacteriostat or fungistat formulations will depend on the particular propiolamide which is used and the specie to be attacked; a typical formulation, for example, may contain from 0.0001% to 0.1% of active ingredient, with the balance being a small quantity of a wetting agent and an inert carrier such as water, an inert organic liquid, or a dust such as talc or pumice. Effective concentrations for use under particular circumstances may be readily determined by those skilled in the art.

What is claimed is:

1. An amide of the formula

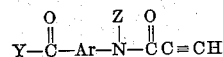

wherein Ar is selected from the class consisting of aromatic hydrocarbon radicals of from 6 to 12 carbon atoms, Y is selected from the class consisting of alkyl radicals of 1 to 8 carbon atoms and alkoxy radicals of 1 to 8 carbon atoms, and Z is selected from the class consisting of hydrogen and alkyl radicals of from 1 to 5 carbon atoms.

2. An alkanoyl-substituted propiolanilide having from 1 to 8 carbon atoms in the alkyl moiety of the said alkanoyl radical, the said alkanoyl radical being substituted on the aromatic ring of the anilide moiety.

3. 4-acetyl-propiolanilide.

4. An alkyl (propiolylamino)benzoate having from 1 to 8 carbon atoms in the alkyl radical.

5. Ethyl 4-propiolylaminobenzoate.

References Cited by the Examiner

UNITED STATES PATENTS

| 2,015,045 | 9/1935 | Teichmann | 167—30 |
| 2,269,791 | 1/1942 | Shonle et al. | 260—471 |
| 2,297,557 | 9/1942 | Hester et al. | 167—30 |
| 2,395,538 | 2/1946 | Curtis | 260—471 |

OTHER REFERENCES

Grob, Helv. Chem. Acta. 39, 417–422 (1956).

LORRAINE A. WEINBERGER, *Primary Examiner.*

DUVAL McCLUTCHEN, D. D. HORWITZ, *Examiners.*

A. D. ROLLINS, A. P. HALLUIN, *Assistant Examiners.*